United States Patent [19]

Frances et al.

[11] Patent Number: 5,767,216
[45] Date of Patent: Jun. 16, 1998

[54] PROCESS FOR THE PREPARATION OF OPTIONALLY ALKOXYLATED POLYORGANOSILOXANE RESIN BY NON-HYDROLYTIC CONDENSATION

[75] Inventors: Jean-Marc Frances, Meyzieu; Hubert Pierre Mutin, Clapiers; Laurence Bourget, Mauguio; Dominique LeClercq, Saint-Clement-de-Riviere; André Vioux, Montferrier, all of France

[73] Assignee: Rhone-Poulenc Chimie, Courbevoie Cedex, France

[21] Appl. No.: 594,398

[22] Filed: Jan. 31, 1996

[30] Foreign Application Priority Data

Jan. 31, 1995 [FR] France .................. 95 01309

[51] Int. Cl.$^6$ .................. C08G 77/06
[52] U.S. Cl. .................. 528/17; 528/19; 556/450
[58] Field of Search .................. 528/10, 14, 15, 528/16, 18, 17, 19; 556/450, 452, 457, 458

[56] References Cited

U.S. PATENT DOCUMENTS 2,485,928 10/1949 Servais .................. 556/450
2,695,307 11/1954 Guillissen et al. .................. 556/453
2,731,485 1/1956 Wagner et al. .................. 556/460

*Primary Examiner*—C. Warren Ivy
*Assistant Examiner*—Garth M. Dahlen
*Attorney, Agent, or Firm*—Burns, Doane, Swecker & Mathis, L.L.P.

[57] ABSTRACT

The present invention relates to the synthesis of optionally alkoxylated polyorganosiloxane (POS) resins by non-hydrolytic condensation. The object is to provide a process which offers the possibility of controlling the crosslinking. This object, inter alia, is achieved by the process according to the invention, which makes provision for carrying out a non-hydrolytic condensation reaction between alkoxysilyl units (Mo1) and halogenosilyl units (Mo2), both of which are carried by identical or different silanes, in the presence of a catalyst of the Lewis acid type, said condensation reaction generating essentially $\equiv$Si—O—Si$\equiv$ linkages and coproducts XR (X=halogen). In this process, the target POS comprise siloxy units D, T and/or Q, or perhaps M, the catalyst is selected from metal compounds or mixtures thereof based on at least one metal belonging to group IIIB, IVB or VB of the periodic table, and the reaction temperature and the initial ratio OR/X are adjusted so that condensation takes place substantially exclusively between the units Mo1 and Mo2, with extreme minimization of secondary condensation between two alkoxy units OR to give the by-product $R_2O$.

21 Claims, No Drawings

PROCESS FOR THE PREPARATION OF OPTIONALLY ALKOXYLATED POLYORGANOSILOXANE RESIN BY NON-HYDROLYTIC CONDENSATION

The present invention relates to the synthesis of optionally alkoxylated polyorganosiloxanes (POS) by non-hydrolytic condensation. More precisely, the invention relates to the reaction of alkoxysilyl units Mo1, on the one hand, and halogenosilyl—preferably chlorosilyl—units Mo2, on the other, by a thermal condensation mechanism, in the absence of water and in the presence of a catalyst of the LEWIS acid type. The units Mo1 and Mo2 can belong to one and the same starting silane and/or to several silanes of different kinds.

Without implying a limitation, the reaction can be represented as follows:

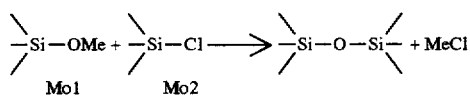

This direct method of synthesizing polyorganosiloxanes (POS) has always seemed particularly attractive as a possible alternative to the indirect methods of synthesizing POS by the hydrolysis and/or alcoholysis of chlorosilanes, followed by posthydrolytic condensation. These indirect methods are the only ones used on the industrial scale. In fact, apart from its simplicity, the direct method would have the advantage of giving reaction by-products such as, for example, methyl chloride (MeCl), a by-product capable of being recycled to give methylchlorosilane, which is the basis, if anything is, of the silicone industry. Furthermore, by using appropriate halogenoalkoxysilanes and/or halogenosilanes and alkoxysilanes, this direct one-step method should make it possible to produce POS resins which are optionally alkoxylated as required. Finally, it could be anticipated that adjustment of the initial ratio OR/X=halogen would additionally make it possible to control the proportion of alkoxy groups in the final resins, where appropriate.

Perhaps these were the expectations of the inventors of U.S. Pat. Nos. 2,485,928, 2,695,307 and 2,731,485, which describe the non-hydrolytic condensation of chlorosilanes with alkoxysilanes or of halogenoalkoxysilanes with one another. These condensation reactions take place in the presence of catalysts of the LEWIS acid type—$FeCl_3$, $ZnCl_2$ and $AlCl_3$ or, respectively, $AlCl_3$ and $BCl_3$—to give linear or crosslinked polysiloxanes.

It should be noted that the condensation reactions according to U.S. Pat. No. 2,485,928 preferably involve chloroethoxydimethylsilanes, or possibly methyltrichlorosilanes, and exclusively $FeCl_3$ as the catalyst. It is even stated, in column 2, lines 51–53, that $FeCl_3$ is the only desirable catalyst.

According to U.S. Pat. No. 2,695,307, a halogenoorganosilane is reacted with an alkoxyorganosilane in the presence of chlorides of the following metals: Al, Zn (Fe, Ca).

U.S. Pat. No. 2,731,485 describes homocondensation or heterocondensation reactions of silanes—SiOR/SiX, X=halogen (Cl) and R=Et—at very high temperatures of 250° C.–300° C. The catalysts used are $AlCl_3$ and $BCl_3$. Such drastic temperature conditions are necessarily damaging. The inventors of said patent note the formation of alkyl ethers as coproducts without making any other comments or drawing any inferences.

Without wishing to deny the didactic and scientific interest of these known patents, this kind of condensation reaction has unfortunately proved incapable of industrial exploitation. In fact, since the objective which was set was to use these techniques to prepare [optionally alkoxylated (e.g. methoxylated)] polyorganosiloxane resins composed in particular of siloxy units D ($SiO_{2/2}$), T ($SiO_{3/2}$) and/or Q ($SiO_{4/2}$), or perhaps M ($SiO_{1/2}$), and optionally carrying radicals (OR), one has hitherto been faced with a serious problem of crosslinking control. This results especially in premature and uncontrollable solidification of the resins. Such a disadvantage is a very clear drawback from the point of view of industrial synthesis, it being self-evident that irreversibly vitrified products are unusable, to mention but one obvious disadvantage.

Moreover, the fact that these relatively old patents have not been followed up, either in scientific and technical terms or in terms of industrial and commercial exploitation, is an indication of the unfavorable technical prejudice against the preparation of e.g. alkoxylated POS by non-hydrolytic homocondensation or heterocondensation in the presence of a LEWIS acid as catalyst.

Notwithstanding, one of the essential objectives which the Applicant set itself was to propose a process for the preparation of (optionally alkoxylated) polyorganosiloxane resins by non-hydrolytic homocondensation or heterocondensation, said process offering the possibility of controlling the crosslinking while at the same time affording a high degree of flexibility and a high degree of freedom of maneuver as regards the construction of alkoxylated or non-alkoxylated POS backbones of diverse types.

Another essential objective of the invention is to provide a process for the preparation of alkoxylated or non-alkoxylated POS resins by non-hydrolytic condensation which is simple and economic to carry out.

Another essential objective of the invention is to provide a process for the preparation of optionally alkoxylated polyorganosiloxane resins by non-hydrolytic condensation which is industrially feasible and which produces technically and commercially exploitable resins.

Another essential objective of the invention is to afford the preparation of alkoxylated or non-alkoxylated liquid POS resins composed of units (D) and (Q) and/or (T) by the non-hydrolytic heterocondensation of alkoxysilanes and halogenosilanes in the presence of a LEWIS acid.

These objectives, inter alia, are achieved by the present invention, which relates to a process for the preparation of optionally alkoxylated (OR) polyorganosiloxane (POS) resins by the non-hydrolytic condensation of at least alkoxysilyl units (Mo1) and halogenosilyl units (Mo2), both of which are carried by identical (homocondensation) or different (heterocondensation) silanes, in the presence of a catalyst of the Lewis acid type, said condensation reaction generating essentially ≡Si—O—Si≡ linkages and coproducts XR (X=halogen), wherein the target POS comprise siloxy units D, T and/or Q, or perhaps M, wherein the catalyst is selected from metal compounds or mixtures thereof based on at least one metal belonging to group IIIB, IVB or VB of the periodic table, given in "LA CHIMIE—dictionnaire encyclopédique" ("CHEMISTRY—an encyclopedic dictionary") J. Angenault—published by DUNOD August 1991, and wherein the reaction temperature and the initial ratio OR/X are adjusted so that condensation takes place substantially exclusively between the units Mo1 and Mo2, with extreme minimization of secondary condensation between two alkoxy units OR to give the by-product $R_2O$.

One of the Applicant's achievements is to have demonstrated, totally surprisingly and unexpectedly, that it is possible to control the non-hydrolytic condensation reaction by taking care to contain the secondary reactions forming the linkage R—O—R which result from homocondensation or heterocondensation of the silanes present in the medium (alkoxyhalogenosilanes or alkoxysilanes and halogenosilanes). Allowing these secondary reactions to take place in order to control them better by varying the selection of the catalyst, the reaction temperature and the initial ratio OR/X constitutes a novel and inventive provision of the process developed by the Applicant.

As is apparent from the foregoing description, the invention firstly involves overturning the technical prejudice relating to non-hydrolytic heterocondensation and homocondensation, and understanding the supplementary phenomenon of secondary homocondensation causing the crosslinking to run away.

Secondly, the approach consisted in identifying the reaction conditions making it possible to control this secondary condensation reaction, which can be represented by the following equation:

Without wishing to be bound by theory, the early solidification observed in the reactions according to the prior art must be attributable to this secondary reaction, which leads to the formation of siloxane bridges and hence to an increase in the degree of crosslinking of the resin. This secondary reaction is not considered in the technical literature of the prior art relating to Si—OR/Si—X heterocondensation reactions. As far as Si—OR/Si—OR alkoxysilane homocondensation is concerned, this is only described at much higher temperatures, namely of the order of 300° C., even in the presence of a LEWIS acid (cf. patent U.S. Pat. No. 2,731,485).

Another important characteristic of the process according to the invention is that the target POS comprise siloxy units D, T and/or Q, or perhaps M. To obtain D, it is necessary to use silanes carrying one unit Mo1 and one unit Mo2 simultaneously, or else on the one hand silanes carrying two units Mo1 and on the other hand silanes carrying two units Mo2. For T, the starting silanes each carry 3 identical or different Mo equal to Mo1 or Mo2; for Q, the starting silanes each carry 4 identical or different Mo equal to Mo1 or Mo2; finally, for M, if present, the starting silanes each comprise one unit Mo equal to Mo1 or Mo2.

Also, in the non-hydrolytic condensation process in question, no reaction is observed in the absence of halogenosilanes, preferably chlorosilanes.

To be slightly more specific as regards one important provision of the invention, namely the selection of the catalyst, it may be pointed out that the metal compounds useful as non-hydrolytic condensation catalysts are advantageously:

carboxylates, halides, (cyclo)alkyl halides, alkoxides, oxyhalides, or mixtures thereof.

In practice, the catalyst is preferably selected from the following list:

$TiCl_4$, $TiBr_4$, $(*PhO)_2$, $TiCl_2$, $*CpTiCl_3$, $Cp_2VCl_2$, $VCl_3$, $VOCl_3$, $ZrCl_4$, $ZrBr_4$, $Zr(OEt)_4$, $Cp_2ZrCl_2$, $Cp_2ZrHCl$, $Cp_2ZrMe_2$, $(C_5Me_5)_2ZrCl_2$, $(C_5Me_5)ZrCl_3$, $CpZrCl_3.2THF$, $HfCl_4$, $NbCl_5$ and mixtures thereof, the zirconium derivatives being more particularly preferred.

Ph=phenyl and Cp=cyclopentadiene.

The difficulty to be surmounted in selecting the catalyst lies in finding a good compromise between condensation rate and selectivity. This can be done for example by using the ratio $[(R)_2O]/[RX]$ as the selectivity assessment criterion, in the knowledge that this ratio will increase as the selectivity decreases. Also, for example, the kinetics will be assessed via the degree of completion of the reaction, determined on the basis of the RCl units formed after a certain time.

Given that the reaction rate increases much more rapidly with temperature than the proportion of $R_2O$, it is possible to adjust the reaction rate without substantially modifying the composition of the resin or the gases.

According to the invention, the principal ≡SiX/≡SiOR condensation reaction, which is accompanied by a secondary ≡SiOR/≡SiOR homocondensation reaction, takes place under particular thermal conditions. Thus the reaction temperature is advantageously set at a value between 70° and 210° C., preferably between 100° and 180° C. and particularly preferably between 130° and 150° C.

To prevent the secondary ≡SiOR/≡SiOR homocondensation reactions from becoming too pronounced and thereby detracting from the satisfactory running of the process, the appropriate catalyst is selected for example from those mentioned above and the reaction temperature is adjusted so that the mean proportion of $R_2O$, the subsidiary coproduct of the formation of the linkages ≡Si—O—Si≡, remains below 10% by weight, preferably below 5% by weight and particularly preferably below 4% by weight, based on the coproduct RX.

It is worth emphasizing that, in a preferred variant of the process according to the invention, the non-hydrolytic condensation reaction in question can be carried out in a closed vessel.

As an alternative, it is also possible to envisage evacuating or discharging the gases formed during the reaction. Said evacuation can be performed continuously or batchwise.

In a preferred mode of carrying out the process of the invention, the silanes used are capable of producing siloxy units D and T or D and Q after condensation, the catalyst used is based on Zr and the initial molar ratio r=OR/X is set below or above a critical value $r_c$, depending on whether it is intended to obtain a solid or liquid resin respectively.

Each catalyst has a corresponding ratio $r_c$ defining the critical gelling point of the ultimate resin via proportions by weight of the starting reactants.

By way of example, it may be indicated that $r_c$ is equal to about 1.35 for a catalyst of the $ZrCl_4$ type.

As far as the reaction times are concerned, they are preferably between 1 and 30 hours so as to be compatible with industrial productivity requirements.

The preferred starting reactants according to the invention are on the one hand alkoxyorganosilanes each containing at least one Mo1 to the exclusion of Mo2, and on the other hand halogenoorganosilanes each containing at least one Mo2 to the exclusion of Mo1.

By way of a practical and non-limiting example, it is specified that the following starting materials can be used:

at least one alkoxysilane of the following formula:

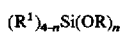

where R and $R^1$ are identical or different and are hydrogen or a hydrocarbon radical, preferably alkyl and/or alkenyl and/or aryl and particularly preferably methyl, ethyl or propyl, butyl, phenyl, (meth)acrylate, epoxide or vinyl, methyl being more particularly preferred, and n=1 to 4, and at least one halogenosilane of the formula $$R^2_{4-m}Si(X)_m$$

where X=halogen, preferably Cl, $R^2$ is as defined above for R and $R^1$ and m=1 to 7.

According to an advantageous provision of the invention, the POS resins prepared contain residual alkoxy groups carried by siloxy units D, T and/or Q.

These residual groups offer the opportunity to graft on a variety of chemical functional groups, for example crosslinking groups of the ethylenically unsaturated type (e.g. vinyl, (meth)acrylate) or of the epoxide type (glycidyl, ethylepoxycyclohexyl). Hydrogen could also replace some of the residual OR groups.

It should be pointed out that the functionalization of these resins can also originate from the initial substituents $R^1$ and $R^2$ of the silicons, as well as from the radicals R of the unreacted OR groups. The chemical functional groups in question are the same as those mentioned above.

In a variant, apart from the units (Mo1) and (Mo2), the condensation reaction according to the invention can involve metal units (Mo3), preferably in the form of metal alkoxides and/or metal salts such as, for example, chlorides.

This makes it possible ultimately to introduce metallic elements such as lanthanides (e.g. cerium), titanium, iron, zirconium or mixtures thereof, inter alia, into the POS resin to give mixed (Si/metal) POS resins.

In practice, the reactants carrying (Mo3), such as metal alkoxides and/or salts, can be incorporated into the starting reaction medium in appreciable amounts, for example in concentrations of up to 80 mol %, preferably 50 mol %.

To complete the range of starting reactants which can be envisaged in the process according to the invention, it is worth noting that it is possible to add units (D) via e.g.:

- cyclic POS, preferably oligomers $D_t$ (where t=number of silicons in the ring, being advantageously between 3 and 20), for example $D_4$;
- and/or halogenopolyorganosiloxanes such as α,ω-chlorodimethylsilylpolydimethylsiloxane;
- and/or POS with trialkylsilyl end groups, such as α,ω-trimethylsilylpolydimethylsiloxane.

As regards the order in which the reactants are introduced into the reaction medium, it is advantageous initially to bring together the catalyst and the reactant carrying (Mo1) (e.g. alkoxysilane), the reactant carrying (Mo2) (e.g. halogenosilane) only being incorporated after a variable period of time.

Through an understanding of the secondary reaction mechanism, the process according to the invention makes it possible to control the crosslinking phenomenon as well as the ratios D/T and/or D/Q and the proportion of OR groups in the resins obtained. This offers the possibility of tailoring the viscosity, volatility and rheology of the resins to the desired values.

To do this, the invention successfully proposes choosing certain particular metal catalysts, preferably $ZrCl_4$, and adjusting the reaction temperature and the initial ratio OR/X. Part of the achievement of the invention is to take account of the undesirable Si—OR/Si—OR homocondensation reactions.

The following Examples of SiCl/SiOMe non-hydrolytic heterocondensation will provide a better understanding of the process according to the invention and will clearly reveal its numerous advantages and practical variants.

EXAMPLES

I—Preliminary Comparative Example: Preparation of resins in the presence of $FeCl_3$ In this Comparative Example, methoxylated polysiloxane resins composed of units D and T (denoted by DT(OMe)) and units D and Q (denoted by DQ(OMe)) were prepared using ferric chloride, $FeCl_3$, as the catalyst. The chosen catalyst concentration is 0.1 mol of $FeCl_3$ per 100 mol of silicon and the reaction temperature is 110° C.; the reactions are carried out in a sealed tube to prevent distillation of the reactants.

1) Resin D/T(OMe)

Target ratio D/T: 0.50

Target proportion of OMe groups per silicon atom: $(OMe/Si)_{final}=0.8$

Stoichiometry of the reaction:

$$3.72\ MeSi(OMe)_3 + 2\ MeSiCl_3 + 1.86\ Me_2Si(OMe)_2 + Me_2SiCl_2$$

Ratio OMe/Cl=1.86

2) Resin D/Q(OMe)

Target ratio D/Q: 2

Target proportion of OMe groups per silicon atom: $(OMe/Si)_{final}=0.8$

Stoichiometry of the reaction:

$$3.72\ Me_2Si(OMe)_2 + 2\ Me_2SiCl_2 + 1.86\ Si(OMe)_4 + SiCl_4$$

OMe/Cl=1.86

It should be pointed out that the theoretical empirical formulae of the target resins are identical in both cases:

$$SiMe_{1.33}(OMe)_{0.80}O_{0.932}.$$

The proportion of bridging oxygen per silicon is less than 1, i.e. less than the proportion in linear or cyclic polysiloxanes (O/Si=1). The resins are therefore expected to be of very low molecular weight, liquid and of low viscosity. However, a solid resin was obtained in both cases. Different experiments carried out at atmospheric pressure, at 60° C., with a condenser cooled to −30° C. and using a flushing gas of high purity (<5 ppm of $H_2O$) gave the same result.

Analysis of the gases formed during the condensation reaction (GC/mass spectrometry and $^1H$ NMR) made it possible to demonstrate the formation of dimethyl ether, $Me_2O$, in addition to the expected methyl chloride. The formation of $Me_2O$ originates from condensation between two methoxy groups:

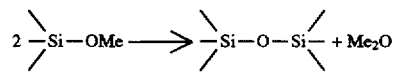

The solidification observed in the previous reactions can therefore be attributed to this secondary reaction, which leads to the formation of siloxane bridges and hence to an increase in the degree of crosslinking of the resin.

This secondary reaction is not considered in the literature relating to Si—OR/Si—Cl condensation reactions. In the case of alkoxysilanes, the Si—OR/Si—OR condensation reaction is only described at much higher temperatures, namely of the order of 300° C. (U.S. Pat. No. 2,731,485), even in the presence of a Lewis acid.

Thus it has been possible to check that the methoxysilanes used ($Si(OMe)_4$, $MeSi(OMe)_3$ and $Me_2Si(OMe)_2$) do not react under our conditions (110° C. and 0.1% $FeCl_3$) in the absence of chlorosilanes. Likewise, no reaction is observed in the presence of MeCl. On the other hand, if a small amount of chlorosilane (0.1 equivalent) is added, a substantial evolution of $Me_2O$ is observed which ceases when the Si—Cl groups have been consumed.

| Reaction (at 110° C., 0.1% $FeCl_3$) | $[Me_2O]/[MeCl]$ |
| --- | --- |
| $Me_2Si(OMe)_2$ + 0.1 $Me_2SiCl_2$ | 0.85 |
| $MeSi(OMe)_3$ + 0.1 $MeSiCl_3$ | 0.68 |
| $Si(OMe)_4$ + 0.1 $SiCl_4$ | 0.37 |

II—First series of selected catalysts

It has therefore been shown that $Me_2O$ is formed during the thermal reaction of a methoxysilane and a chlorosilane in the presence of $FeCl_3$ catalyst, regardless of the units D, T or Q used. This secondary reaction leads to an increase in the degree of crosslinking of the resins and can cause the resins to solidify. Furthermore, the two products MeCl and $Me_2O$ have identical boiling points and are difficult to separate.

The catalysts selected for overcoming the technical problem brought to light by the invention, namely SiOR/SiOR secondary homocondensation, were chosen by means of the experimental protocol given below.

Dimethoxydimethylsilane and dichlorodimethylsilane are reacted in proportions of 10/1 in the presence of various Lewis acid catalysts. The use of difunctional compounds is proposed by way of example in order to avoid mass transfer problems with higher molecular weights. This avoids the risk of solidification of the resins which is typical of sealed tube reactors, where stirring is not possible and in which the reaction medium should not therefore be too viscous. It had also been shown that the formation of $Me_2O$ is maximal for units D. In addition, excess methoxysilane is used in order to favor the formation of $Me_2O$, if appropriate, and facilitate its detection. The different catalysts are used in an amount of 1 mol % of the total number of mol of silicon. The reaction is carried out at 110° C. in a sealed tube and the ratio $[Me_2O]/[MeCl]$ at the end of the reaction (i.e. when all the Si—Cl bonds have been consumed) is determined by proton NMR.

The degree of completion of the reaction is given (based on the MeCl formed) after x hours at 110° C.

The different results obtained for the selected catalysts are collated in Table 1 below.

TABLE 1

| Catalyst | $[Me_2O]/[MeCl]$ | Degree of completion |
| --- | --- | --- |
| Reference $FeCl_3$ 1% | ca. 2.8 | 79% (23 h) |
| Zr carboxylate 1% | 0.25 | 40% (16 h) |
| $ZrCl_4$ 1% | 0.23 | 67% (22 h 30 min) |
| $TiCl_4$ 1% | 0.03 | 60% (63 h) |

The results obtained show that the selectivity depends on the catalyst used. The formation of $Me_2O$ is maximal in the case of $FeCl_3$. Titanium tetrachloride, $TiCl_4$, is the most selective catalyst, less than 3% of $Me_2O$ being detected (sensitivity limit of the analysis). In this case, however, the reaction is very slow (60% conversion of the Si—Cl bonds in 63 h compared with 56% for $FeCl_3$ 0.1% in 16 h 30 min).

It seems on the basis of these data that the catalysts which offer the best compromise between condensation rate and selectivity are zirconium tetrachloride and zirconium carboxylate.

III—Second series of selected catalysts

The following reaction is chosen for selecting this second series of catalysts:

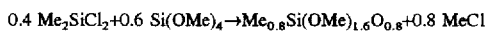

0.4 $Me_2SiCl_2$+0.6 $Si(OMe)_4 \rightarrow Me_{0.8}Si(OMe)_{1.6}O_{0.8}$+0.8 MeCl Cat. 1%

130° C.

The best activity and selectivity are sought. In particular, an attempt is made to avoid the secondary reaction of dimethyl ether formation, which is substantial with a catalyst based on ferric chloride.

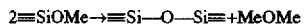

2≡SiOMe→≡Si—O—Si≡+MeOMe

The different degrees of completion of the reaction are recorded by $^1H$ NMR in a sealed tube and the selectivity of the reaction is recorded on the basis of the ratio $[Me_2O]/[MeCl]$.

The results obtained are collated in Table 2 below.

The zirconium derivatives give the best selectivity/activity compromise.

Zirconium tetrachloride affords a degree of completion of 89% in sixteen hours, very little dimethyl ether being formed. Approximately the same activity is found when starting with the zirconium alkoxide $Zr(OEt)_4$.

The activity of the catalyst depends on the temperature. Conversion of the SiCl bonds is total in 25 hours at 140° C. and in one hour thirty minutes at 200° C. The percentage of dimethyl ether formed at 140° C. is 3.5% and increases substantially to 7% at 200° C.

TABLE 2

| CATALYST | $[Me_2O]/[MeCl]$ | DEGREE OF COMPLETION OF THE REACTION |
| --- | --- | --- |
| Reference $FeCl_3$ (1%o) | 0.200 | 60.0% (16 h) |
| $TiCl_4$ | ≦0.010 | 30.0% (16 h) |
| $TiBr_4$ | ≦0.010 | 29.0% (16 h) |
| $(PhO)_2TiCl_2$ | 0.036 | 49.0% (15 h 15 min) |
| $CpTiCl_3$ | ≦0.010 | 2.4% (15 h 15 min) |
| $Cp_2VCl_2$ | ≦0.010 | 40.8% (16 h) |
| $VCl_3$ | ≦0.010 | 2.4% (16 h) |
| $VOCl_3$ | ≦0.010 | 25.0% (16 h) |
| $ZrCl_4$ | 0.037 | 88.9% (16 h) |
| $ZrBr_4$ | 0.040 | 73.6% (16 h) |
| $Zr(OEt)_4$ | 0.040 | 80.8% (16 h) |
| $Cp_2ZrCl_2$ | ≦0.010 | 24.4% (16 h) |
| $Cp_2ZrHCl$ | 0.050 | 72.0% (16 h) |
| $Cp_2ZrMe_2$ | 0.030 | 30.0% (16 h) |
| $(C_5Me_5)_2ZrCl_2$ | ≦0.010 | 4.8% (16 h) |
| $(C_5Me_5)ZrCl_3$ | 0.025 | 91.6% (16 h) |
| $CpZrCl_3.2THF$ | 0.032 | 90.7% (16 h) |
| $HfCl_4$ | 0.070 | 96.7% (16 h) |
| $NbCl_5$ | 0.045 | 36.0% (16 h) |

Cp = cyclopentadienyl

IV—Preparation of resins D/Q(OMe) in the presence of $TiCl_4$ and $ZrCl_4$

The objective here is to obtain, by catalysis with $ZrCl_4$ (1%), the resins D/T(OMe) and D/Q(OMe) which could not be prepared previously in Example (I) with $FeCl_3$. The reactions were carried out at 110° C. in a sealed tube.

1) Resin D/T(OMe)

Stoichiometry of the reaction:

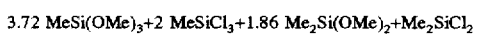

3.72 $MeSi(OMe)_3$+2 $MeSiCl_3$+1.86 $Me_2Si(OMe)_2$+$Me_2SiCl_2$

OMe/Cl=1.86

2) Resin D/Q(OMe)
Stoichiometry of the reaction:

3.72 Me$_2$Si(OMe)$_2$+2 Me$_2$SiCl$_2$+1.86 Si(OMe)$_4$+SiCl$_4$

OMe/Cl=1.86

With ZrCl$_4$, the resin obtained is a very slightly viscous product with the appearance of an oil. The concentration ratio [Me$_2$O]/[MeCl] at the end of the reaction and the $t_{1/2}$, i.e. the time after which half of the Si—Cl bonds have reacted, are given in Table 3 below.

TABLE 3

| RESIN (D/T) | | RESIN (D/Q) | |
|---|---|---|---|
| [Me$_2$O]/[MeCl] | $t_{1/2}$ | [Me$_2$O]/[MeCl] | $t_{1/2}$ |
| 0.034 | 15 h | 0.060 | 10 h |

It is found that Me$_2$O is formed in very minor proportions under the actual reaction conditions. The secondary reaction is negligible compared with the condensation reaction resulting in the formation of MeCl. This high selectivity affords good control over the degree of crosslinking of the resins. The degree of condensation is excellent in both cases: above 99% after 64 hours at 110° C. for the resin D/T and after 40 hours for the resin D/Q.

V—Influence of the temperature

The reactivity and selectivity of TiCl$_4$ and ZrCl$_4$ were compared at different temperatures. This study was carried out for resins D/Q(OMe) containing 60% of units Q.

Stoichiometry of the reaction:

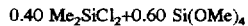

0.40 Me$_2$SiCl$_2$+0.60 Si(OMe)$_4$

The target final composition is therefore: SiMe$_{0.8}$(OMe)$_{1.6}$O$_{0.8}$.

Conditions: sealed tubes; 1 mol of catalyst per 100 mol of silicon.

The results obtained are summarized in Table 4 below.

TABLE 4

| Catalyst | ZrCl$_4$ | | | | TiCl$_4$ | | | |
|---|---|---|---|---|---|---|---|---|
| Temperature | 105° C. | 125° C. | 140° C. | 200° C. | 105° C. | 125° C. | 140° C. | 200° C. |
| $t_{1/2}$ (h) | 10 | 2.5 | 1.5 | — | 104 | 37 | 28 | — |
| t (end of reaction) (h) | 125 | 100 | 25 | 1.5 | >230 | >160 | >160 | 25 |
| [Me$_2$O]/[MeCl] | 0.03 | 0.04 | 0.04 | 0.08 | 0.01 | 0.015 | 0.02 | 0.08 |
| % Me$_2$O (w/w) | 3 | 3.5 | 3.5 | 7 | 1 | 1.3 | 2 | 7 |

This Table shows that the reactivity increases with temperature. TiCl$_4$ is very selective between 105° C. and 140° C. but the reaction time is long. At 200° C., the reaction time is more reasonable (24 h) but the selectivity is lower with a ratio [Me$_2$O]/[MeCl] of 0.08. ZrCl$_4$ appears to be more advantageous as the selectivity at 140° C. is better ([Me$_2$O]/[MeCl]=0.04) for the same reaction time.

It should be pointed out that for the composition 0.40 Me$_2$SiCl$_2$+0.60 Si(OMe)$_4$ used here, the redistribution equilibrium is reached (according to proton NMR) in less than 18 h (ZrCl$_4$) or 30 h (TiCl$_4$) at room temperature and in less than 1 h in both cases at 105° C.

VI—Experiment with evacuation of the gasses formed

This experiment, comprising discharge of the gases formed during the reaction, was carried out using the same composition with ZrCl$_4$ 1% at 140° C. The degree of completion of the reaction (estimated from the integrations of the methyls on the silicon), the molar ratio [Me$_2$O]/[MeCl] and the percentage by weight of Me$_2$O are given in Table 5 below.

TABLE 5

| Time (h) | 0 | 1 | 2.5 | 4.5 | 7 | 8.75 | 24.5 |
|---|---|---|---|---|---|---|---|
| SiMe$_2$Cl/SiMe$_2$ | 1.08 | 0.84 | 0.30 | 0.16 | 0.06 | 0.04 | <0.01 |
| Estimated °comp. (%) | 0 | 45 | 70 | 75 | 85 | 95 | >98 |
| [Me$_2$O]/[MeCl] | — | — | 0.035 | 0.042 | 0.055 | 0.056 | 0.10 |
| % Me$_2$O (w/w) | — | — | 3.1 | 3.7 | 4.8 | 4.9 | 8.3 |

The reaction seems to be slightly more rapid than in a sealed tube (at t=7 h, SiCl/SiMe$_2$=0.12 in a sealed tube at 140° C.). The proportion of Me$_2$O increases during the reaction, undoubtedly because of the increase in the ratio Si—OMe/Si—Cl. However, the mean proportion of Me$_2$O estimated by "integrating" % Me$_2$O=f (degree of completion) is about 3.3%, i.e. very close to that observed in a sealed tube at the same temperature (3.5%).

Comments:

Examples I to VI show the advantage of non-hydrolytic condensation between methoxysilanes and chlorosilanes in the preparation of methoxylated liquid resins composed of units D and Q or D and T.

The participation of condensation reactions between two methoxysilane groups with the elimination of methyl ether, resulting in an increase in the degree of crosslinking of the resins, has been demonstrated. It has been shown that the selectivity depends on the catalyst used, the temperature, the initial ratio OMe/Cl and the number of methyl groups on the silicon. In the presence of FeCl$_3$, which is one of the most widely employed catalysts in SiOR/SiCl condensation, this secondary reaction does not enable the target resins to be obtained (solidification).

By contrast, these resins can be prepared, with reasonable reaction times and a small proportion of Me$_2$O, by using catalysts based on metals of groups IIIB, IVB and VB, preferably based on Zr.

VII—Synthesis of other resins DQ(OMe)

A—Several resins DQ(OMe) [VII.1 to VII.3] were synthesized by this process with an alkylhalogenosilane and a tetraalkoxysilane:

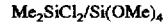

Me$_2$SiCl$_2$/Si(OMe)$_4$

These resins DQ(OR) were synthesized in a 1 liter reactor of the Prolabo "bomb" reactor type (stainless steel), the experiments being compared with the sealed tube experiments.

The reaction is as follows (D/Q=50/50):

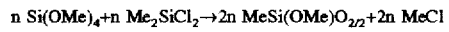

n Si(OMe)$_4$+n Me$_2$SiCl$_2$→2n MeSi(OMe)O$_{2/2}$+2n MeCl

Three experiments, VII.1 to VII.3, were carried out:

VII.1: n=0.01; 7 h at 145° C.; sealed tube

VII.2: n=0.01; 24 h at 130° C.; sealed tube with stainless steel bar

VII.3: n=0.89; 2 h at 165° C.; 38 bar; viscosity of the final resin 70 mPa; degree of conversion of SiCl>98%.

| | 29Si NMR: % Si | | |
|---|---|---|---|
| | VII.1 | VII.2 | VII.3 |
| D(OR)$^2$ | 4.4 | 4.5 | 4.6 |
| D(OR) | 19 | 19.7 | 19 |
| D | 25.7 | 23.5 | 25.6 |
| Q(OR)$^4$ | 0.4 | 0.2 | 0.3 |
| Q(OR)$^3$ | 3 | 3.8 | 2.9 |
| Q(OR)$^2$ | 12.3 | 13.9 | 11.6 |
| Q(OR) | 22.2 | 22.2 | 22.7 |
| Q | 13 | 12.2 | 13.3 |
| D/Q | 49.1/50.9 | 47.7/52.3 | 49.2/50.8 |

The distribution of the methoxy groups on the units D and Q can be determined from these NMR integration values. This gives a resin of the formula $$[Me_2Si(OMe)_{0.566}O_{0.717}]_{0.491}[Si(OMe)_{1.128}O_{1.436}]_{0.509} \quad (VII.1)$$

The probability of finding Si(OMe) groups around the silicons of the units D and Q is given by:

$$p^{(DOMe)} = N_{Si-OMe}/N_{grp} = 0.566/2 = 0.283 \text{ and } p^{(DOSi)} = 1 - p^{(DOMe)} = 0.717$$

$$p^{(QOMe)} = N_{Si-OMe}/N_{grp} = 1.128/4 = 0.282 \text{ and } p^{(QOSi)} = 1 - p^{(QOMe)} = 0.718$$

The distribution of the Si—OMe groups on the units D or Q is arbitrary and purely random. The same applies to the siloxane bridges.

It is then possible to calculate the percentages of the different sites D(OMe)$^2$, D(OMe), D and Q(OMe)$^x$ (0≦x≦4) by assuming a perfectly random distribution of the Si—OMe groups.

This will give:

% D (OMe)$^2$ = [p$^{(DOMe)}$]$^2$ × 100
% D(OMe) = 2 × [p$^{(DOMe)}$][p$^{(DOSi)}$] × 100
% D = [p$^{(DOSi)}$]$^2$ × 100
% Q (OMe)$^4$ = [p$^{(QOMe)}$]$^4$ × 100
% Q (OMe)$^3$ = 4 [p$^{(QOMe)}$]$^3$[p$^{(QOSi)}$] × 100
% Q (OMe)$^2$ = 6 [p$^{(QOMe)}$]$^2$[p$^{(QOSi)}$]$^2$ × 100
% Q(OMe) = 4[p$^{(QOMe)}$] [p$^{(QOSi)}$]$^3$ × 100
% Q = [p$^{(QOSi)}$]$^4$ × 100

The experimental percentages deduced from the NMR spectrum are in agreement with the statistical data.

| Group | D(OR)$^2$ | D(OR) | D | Q(OR)$^4$ | Q(OR)$^3$ | Q(OR)$^2$ | Q(OR) | Q |
|---|---|---|---|---|---|---|---|---|
| % stat | 8 | 40.6 | 51.4 | 0.6 | 6.4 | 24.6 | 41.8 | 26.6 |
| % VII.1 | 8.8 | 38 | 51.4 | 0.8 | 5.9 | 24.2 | 43.6 | 25.5 |
| % VII.3 | 9 | 38 | 51.2 | 0.6 | 5.8 | 23.2 | 45.4 | 26.4 |

B—Comparison with a hydrolytic process

Three resins (VII.4 to VII.6) are synthesized, two resins by the non-hydrolytic method (SiCl/SiOMe) with a ratio D/Q of 39/61 (VII.4) and 63/37 (VII.5), and one resin by a hydrolytic process (VII.6) with a ratio D/Q of 66/33, from Si(OMe)$_4$ and D$_4$=octamethylcyclotetrasiloxane (catalyst H$^+$).

The NMR values obtained are given below:

| | 29Si NMR: % Si | | |
|---|---|---|---|
| | VII.4 | VII.5 | VII.6 |
| D(OR)$^2$ | 7.2 | 1.7 | 0.9 |
| D(OR) | 19.5 | 20.1 | 21.6 |
| D | 12.3 | 41.8 | 45 |
| Q(OR)$^4$ | 3.0 | 0 | 5.6 |
| Q(OR)$^3$ | 13.8 | 1.0 | 16.8 |
| Q(OR)$^2$ | 23.9 | 7.2 | 8.8 |
| Q(OR) | 16.0 | 18.0 | 1.2 |
| Q | 3.5 | 10.3 | 0 |
| D/Q | 39/61 | 63.6/36.4 | 67.5/32.5 |

$[Me_2Si(OMe)_{0.869}O_{0.565}]_{0.39}[Si(OMe)_{1.92}O_{1.04}]_{0.61}$    VII.4

$[Me_2Si(OMe)_{0.369}O_{0.815}]_{0.635}[Si(OMe)_{0.97}O_{1.515}]_{0.365}$    VII.5

$[Me_2Si(OMe)_{0.347}O_{0.827}]_{0.675}[Si(OMe)_{2.818}O_{1.591}]_{0.325}$    VII.6

This gives the following probabilities:

| | VII.4 | VII.5 | VII.6 |
|---|---|---|---|
| p$^{(DOMe)}$ | 0.435 | 0.185 | 0.174 |
| p$^{(DOSi)}$ | 0.565 | 0.815 | 0.826 |
| p$^{(QOMe)}$ | 0.484 | 0.243 | 0.705 |
| p$^{(QOSi)}$ | 0.516 | 0.757 | 0.295 |

The hydrolytic process VII.6 gives completely different probabilities of encountering an Si—OMe end group on units D or on units Q. There is an enormous excess of Si(OMe) end groups on the units Q.

What is claimed is:

1. A process for the preparation of optionally alkoxylated (OR) polyorganosiloxane (POS) resins by the non-hydrolytic condensation of at least alkoxysilyl units (Mo1) and halogenosilyl units (Mo2), both of which are carried by identical (homocondensation) or different (heterocondensation) silanes, in the presence of a catalyst of the Lewis acid type, said condensation reaction generating ≡Si—O—Si≡ linkages and coproducts RX where X is halogen, and wherein the target POS comprise siloxy units D, T and/or Q, wherein the catalyst is selected from metal compounds or mixtures thereof based on at least one metal belonging to group IIIB, IVB or VB of the periodic table, and wherein the reaction temperature and the initial ratio OR/X are adjusted so that condensation takes place between the units Mo1 and Mo2, with minimization of secondary condensation between two alkoxy units OR to give the by-product R$_2$O wherein the catalyst is selected and the reaction temperature is adjusted so that the mean proportion of R$_2$O remains below 10% by weight based on the coproduct RX.

2. A process according to claim 1 wherein the metal compounds useful as non-hydrolytic condensation catalysts are:

carboxylates, halides, (cyclo)alkyl halides, alkoxides, oxyhalides, or mixtures thereof.

3. A process according to claim 1 or 2 wherein the catalyst is selected from the following list:

$TiCl_4$, $TiBr_4$, $(PhO)_2$, $TiCl_2$, $CpTiCl_3$, $Cp_2VCl_2$, $VCl_3$, $VOCl_3$, $ZrCl_4$, $ZrBr_4$, $Zr(OEt)_4$, $Cp_2ZrCl_2$, $Cp_2Zr$—HCl, $Cp_2ZrMe_2$, $(C_5Me_5)_2ZrCl_2$, $(C_5Me_5)ZrCl_3$, $CpZrCl_4.2THF$, $HfCl_4$, $NbCl_5$ and mixtures thereof.

4. A process according to claim 1 wherein the reaction temperature is between 70° and 210° C.

5. A process according to claim 1 wherein the silanes used are capable of producing siloxy units D and T or D and Q after condensation, the catalyst used is based on Zr and the initial molar ratio r=OR/X is set below or above a critical value $r_c$, depending on whether it is intended to obtain a solid or liquid resin respectively.

6. A process according to claim 5 wherein $r_c$ is equal to about 1.35.

7. A process according to claim 1 wherein the non-hydrolytic condensation reaction in question is carried out in a closed vessel.

8. A process according to claim 1 wherein provision is made for discharging the cases formed during the reaction.

9. A process according to claim 1 wherein the following starting materials are used:

at least one alkoxysilane of the formula

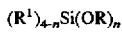

where R and $R^1$ are identical or different and are hydrogen or a hydrocarbon radial and n=1 to 4, and at least one halogenosilane of the formula

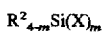

where X=halogen, $R^2$ is as defined above for R and $R^1$, and m=1 to 4.

10. A process according to claim 1 wherein, apart from the units (Mo1) and (Mo2), the condensation reaction involves metal units (Mo3), introduced by way of reactants selected from metal alkoxides and/or salts and mixtures thereof.

11. A process according to claim 1 wherein in addition to the silanes, the following are included as starting reactants:

cyclic POS;

and/or halogenopolyorganosiloxanes;

and/or POS with trialkylsilyl end groups.

12. A process of claim 1 wherein the catalyst is selected and the reaction temperature is adjusted so that the mean proportion of the $R_2O$ remains below 5% by weight based on the coproduct RX.

13. A process of claim 1 wherein the catalyst is selected and the reaction temperature is adjusted so that the mean proportion of the $R_2O$ remains below 4% by weight based on the coproduct RX.

14. A process according to claim 1 wherein the catalyst is selected from the following list:

$ZrCl_4$, $ZrBr_4$, $Zr(OEt)_4$, $Cp_2ZrCl_2$, $Cp_2Zr$—HCl, $Cp_2Zr(CH_3)_2$, $(C_5Me_5)_2ZrCl_2$, $(C_5Me_5)ZrCl_3$, $CpZrCl_4.2THF$, and mixtures thereof.

15. A process according to claim 1 wherein the reaction temperature is between about 100° and 180° C.

16. A process according to claim 1 wherein the reaction temperature is between about 130° and 150° C.

17. The process of claim 9 wherein R and $R^1$ are identical or different and are selected from the group consisting of alkyl, alkenyl, and aryl.

18. The method of claim 9 wherein R and $R^1$ are identical or different and are selected from the group consisting of methyl, ethyl, propyl, butyl, phenyl, (meth)acrylate, epoxide, and vinyl.

19. The process of claim 9 wherein X is chlorine.

20. A process according to claim 10 wherein the metal of said metal alkoxides and/or salts is selected from the group consisting of lanthanides, titanium, iron, zirconium and mixtures thereof.

21. A process according to claim 11 wherein the cyclic POS is an oligomer $D_t$, wherein t is the number of silicon atoms in the ring and is between 3 and 20.

* * * * *